United States Patent
Pank

(10) Patent No.: US 7,875,174 B2
(45) Date of Patent: Jan. 25, 2011

(54) APPARATUS FOR SEPARATING A LIGHT FLUID FROM A HEAVY ONE AND/OR REMOVING SEDIMENT FROM A FLUID STREAM

(76) Inventor: Thomas E. Pank, 10546 Harp Rd., Walkersville, MD (US) 21793

( * ) Notice: Subject to any disclaimer, the term of this patent is extended or adjusted under 35 U.S.C. 154(b) by 0 days.

(21) Appl. No.: 12/074,680

(22) Filed: Mar. 5, 2008

(65) Prior Publication Data

US 2008/0217227 A1    Sep. 11, 2008

Related U.S. Application Data

(60) Provisional application No. 60/905,612, filed on Mar. 7, 2007, provisional application No. 60/905,520, filed on Mar. 7, 2007.

(51) Int. Cl.
*B01D 21/02* (2006.01)
(52) U.S. Cl. ............ 210/170.03; 210/254; 210/521; 210/532.1; 210/538
(58) Field of Classification Search .......... 210/170.03, 210/254, 521, 532.1, 538, 540, 747
See application file for complete search history.

(56) References Cited

U.S. PATENT DOCUMENTS

| | | | |
|---|---|---|---|
| 1,778,326 A | 10/1930 | Kutzer | |
| 3,862,040 A * | 1/1975 | Preus et al. | 210/540 |
| 5,433,845 A * | 7/1995 | Greene et al. | 210/170.03 |
| 5,746,911 A | 5/1998 | Pank | |
| 6,077,448 A * | 6/2000 | Tran-Quoc-Nam et al. | 210/521 |
| 6,264,835 B1 | 7/2001 | Pank | |
| 6,315,897 B1 * | 11/2001 | Maxwell | 210/170.03 |
| 6,547,962 B2 * | 4/2003 | Kistner et al. | 210/170.03 |
| 6,783,683 B2 * | 8/2004 | Collings | 210/532.1 |
| 7,314,549 B2 * | 1/2008 | Swift | 210/170.03 |
| 2002/0139736 A1 * | 10/2002 | Stever et al. | 210/170 |
| 2005/0103698 A1 * | 5/2005 | Eberly | 210/532.1 |
| 2005/0109707 A1 * | 5/2005 | Bryant | 210/747 |

* cited by examiner

*Primary Examiner*—Christopher Upton
(74) *Attorney, Agent, or Firm*—ZITO tlp

(57) ABSTRACT

An input chamber receives runoff water to be cleaned. Part of the way up the chamber wall is a restricted outlet which feeds a system for cleaning the water. At a still higher elevation another opening allows runoff water to flow to another cleaning system. Near the top of the chamber is an outlet pipe. A vertical baffle in front of the outlet cleans water that flows under the baffle on its way to the outlet. When the incoming flow rate is very high, water passes over the baffle to the outlet.

5 Claims, 3 Drawing Sheets

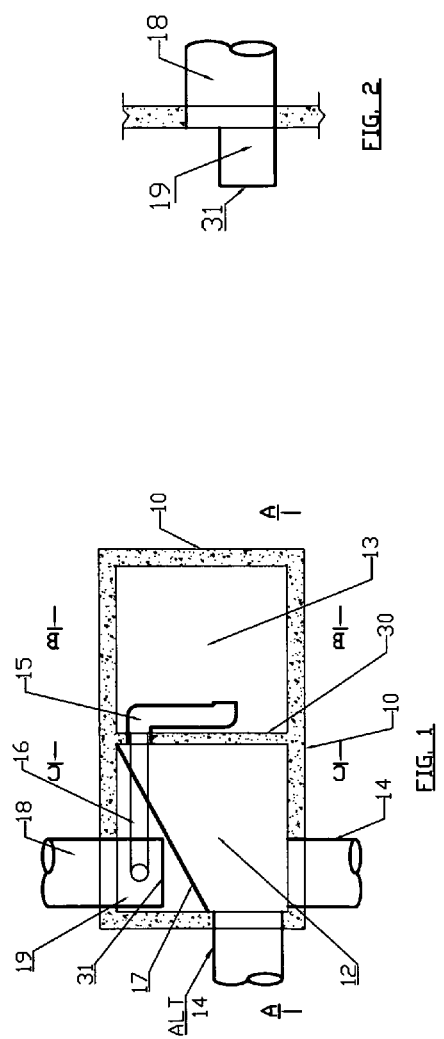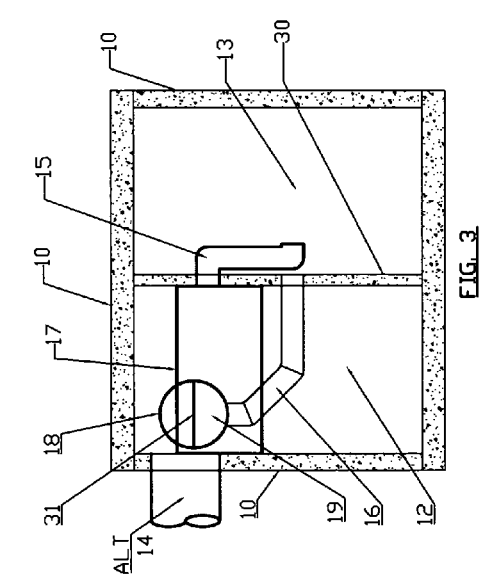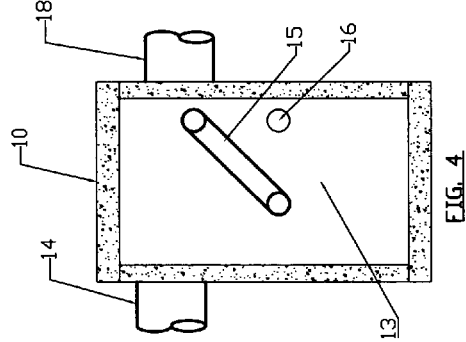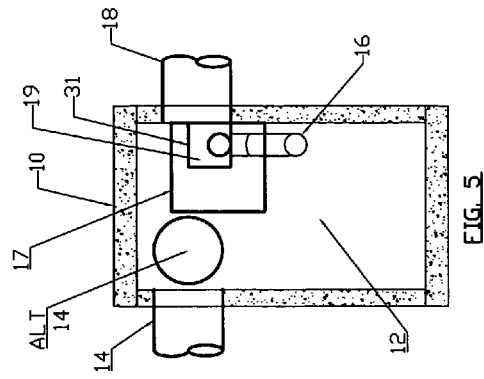

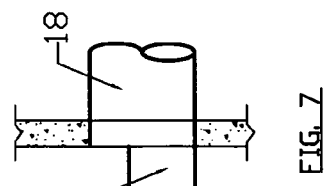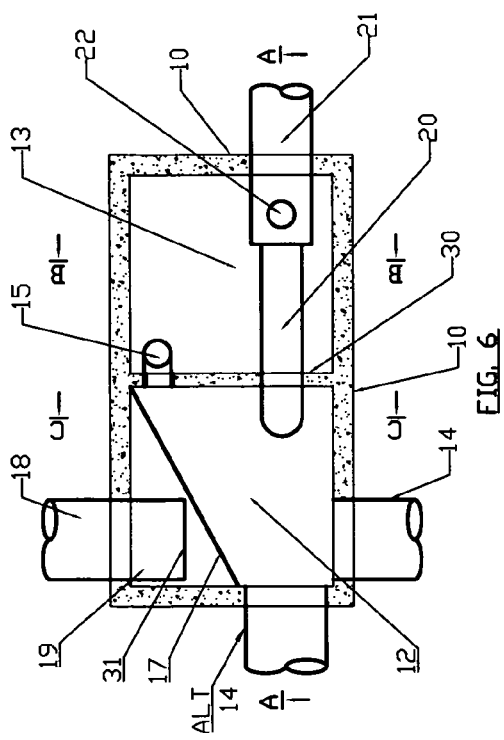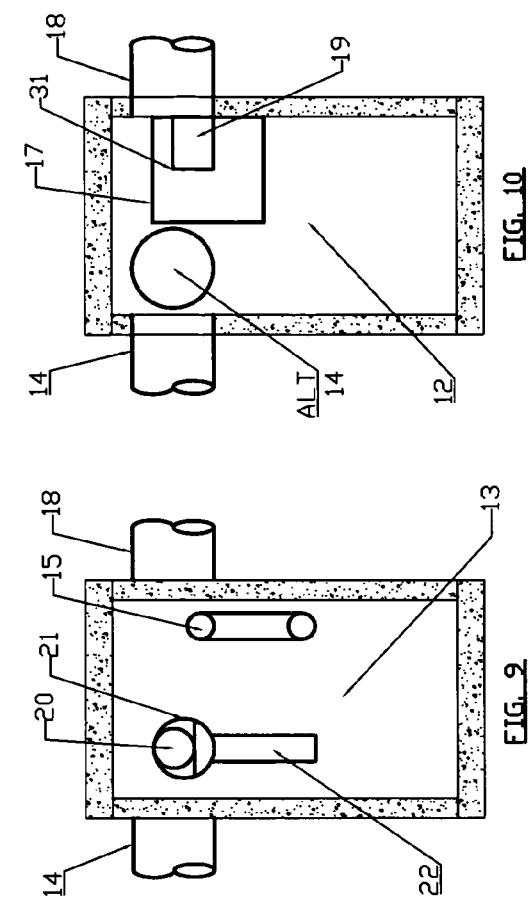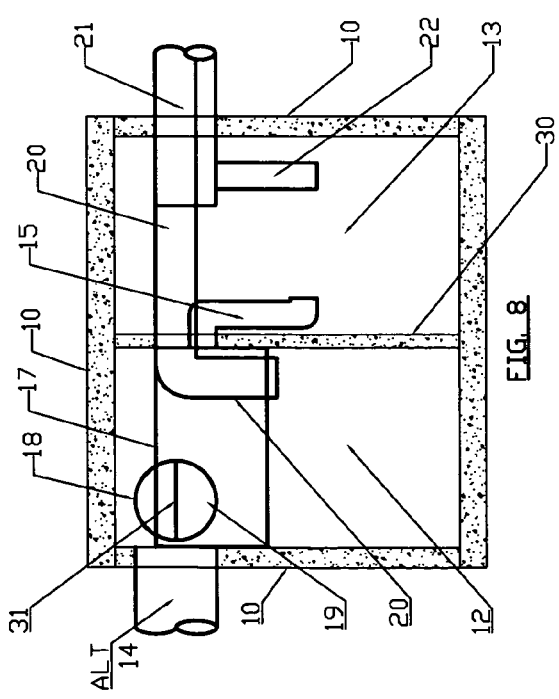

APPARATUS FOR SEPARATING A LIGHT FLUID FROM A HEAVY ONE AND/OR REMOVING SEDIMENT FROM A FLUID STREAM

RELATED CASES

I claim the benefit of (a) my prior provisional application Ser. No. 60/905,612 filed Mar. 7, 2007 and (b) my prior provisional application Ser. No. 60/905,520 filed Mar. 7, 2007.

BACKGROUND OF THE INVENTION

The present invention is an improved form of Pank's U.S. Pat. Nos. 5,746,911, and 6,264,835, both entitled "Apparatus for Separating a Light From a Heavy Fluid." Like these two devices, the present invention has three separate flow paths for influent water, and treats contaminated water at varying levels of efficiency, depending on the influent flow rate.

When it rains on a parking lot, a road, or other impervious surface, the water will not permeate into the ground as it once did, and instead this water will runoff and discharge directly into a stream or receiving body. Since these impervious surfaces typically have vehicles or traffic on them, an accumulation of pollutants will occur between rain events. This runoff is then concentrated because it is unable to be absorbed into the ground, and the pollutants are concentrated as well. This has caused a severe degradation of our watersheds. Most of the pollutants are typically washed off in the beginning (which is usually the less intense part of the storm), consequently the first runoff water is the most critical to treat. In an effort to minimize the impacts of this, systems have been developed to treat this water by removing the pollutants by separation or filtration.

Because precipitation occurs at variable rates from a small trickle to a monsoon, the system must be able to capture the pollutants and not release them during the high flow events. Consequently treating stormwater creates additional difficulties because the system must be able to clean the water yet be able to pass very intense storms or flooding could occur.

SUMMARY OF THE INVENTION

Runoff water has three flow rates as follows: (1) a relatively low rate of flow, (2) an intermediate rate of flow and (3) a relatively high rate of flow.

When the flow is at the relatively low rate, the runoff water is thoroughly cleaned by the invention.

When the runoff water has an intermediate rate of flow, the portion of the water which is equal to the maximum volume of the low rate is given the same cleaning as if it had been a low rate of flow. The excess flow that exceeds the low rate of flow is given a cleaning that is less thorough than the water having a low rate of flow. This excess flow raises the water level in the first compartment, hence that water flows under a baffle to the outlet conduit. Flow under the baffle partly cleans the water.

When the incoming runoff water has said relatively high rate of flow, that portion of such high rate of flow that would be equal to an intermediate rate of flow, is given a cleaning equal to the cleaning of an aforesaid intermediate flow.

The first compartment has an input conduit for feeding the first compartment with runoff water. The first compartment also has an output conduit that enters the compartment near at its upper end and at or near a corner of the compartment. A large baffle is adjacent the input of the outlet conduit and requires the water (other than that which is fed to the outer conduit via said second compartment) to go under, or above, the baffle in order to reach the outlet conduit.

When runoff water enters the first compartment via said inlet conduit, it rises to the level of a conduit of restricted size. The latter conduit carries the contaminated runoff water to the second compartment where the contaminants, that are lighter in weight than clean water, move up to the surface and float. Heavier particles in the runoff water fall to the bottom of the second compartment, leaving the water near the center of the second compartment to be relatively clean water. Another conduit delivers said relatively clean water to the outlet conduit of the first compartment.

When the runoff water entering the first compartment has an intermediate rate of flow, that portion of it that does not flow through said restricted conduit, flows under said baffle and to said outlet conduit. The flow under the baffle causes any oil or other light weight particles to float and hence do not enter the outlet conduit.

When the incoming runoff water has a high rate of flow, part of the water takes the paths of the aforesaid intermediate rate of flow. The remaining water passes over said baffle to said output conduit.

In a modified form of the invention a portion of the water in the first compartment is fed to a diverted flow outlet basin.

BRIEF DESCRIPTION OF THE DRAWINGS

FIG. 1 is a plan view of the preferred form of the invention.
FIG. 2 is a side view of the outlet basin shown in FIG. 1.
FIG. 3 is a cross-section along line A-A of FIG. 1.
FIG. 4 is a cross-section along line B-B of FIG. 1.
FIG. 5 is a cross-section along line C-C of FIG. 1.
FIG. 6 is a plan view of a modified form of the invention.
FIG. 7 is a side view of the outlet basin of FIG. 6.
FIG. 8 is a cross-section along line A-A of FIG. 6.
FIG. 9 is a cross-section along line B-B of FIG. 6.
FIG. 10 is a cross-section along line C-C of FIG. 6.

DETAILED DESCRIPTION

Figure 12:
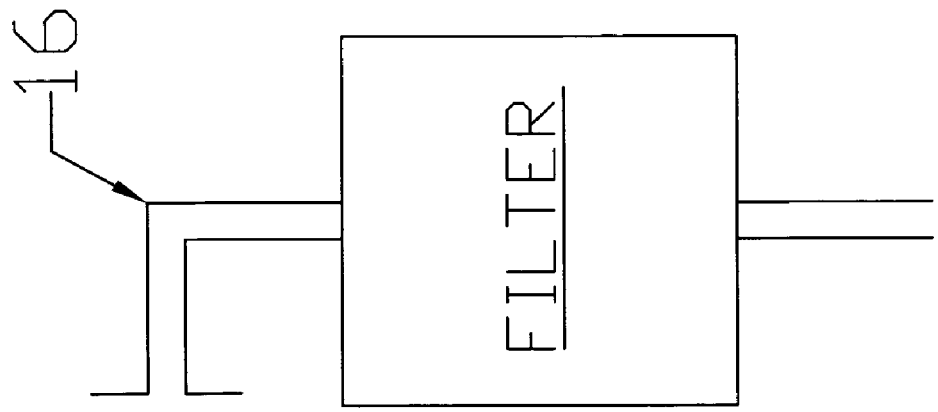
FIG. 12 is a schematic diagram of a filter that may be added to conduit 16 of FIGS. 1 and 2.

When it rains on a parking lot, a road, or other impervious surface, the water will not permeate into the ground as it once did, and instead this water will runoff and discharge directly into a stream or receiving body. Since these impervious surfaces typically have vehicles or traffic on them, an accumulation of pollutants will occur between rain events. This runoff is then concentrated because it is unable to be absorbed into the ground, and the pollutants are concentrated as well. This has caused a severe degradation of our watersheds. Most of the pollutants are typically washed off in the beginning and usually less intense part of the storm, consequently the first runoff water is the most critical to treat. In an effort to minimize the impacts of this, systems have been developed to treat this water by removing the pollutants by separation or filtration.

Because precipitation occurs at variable rates from a small trickle to a monsoon, the system must be able to capture the pollutants and not release them during the high flow events. Consequently treating Stormwater creates additional difficulties because the system must be able to clean the water yet be able to pass very intense storms or flooding could occur.

The apparatus described herein is an apparatus for treating stormwater where the pollutants are stored off line. The modified form of the invention diverts a certain level of flow and/or volume of stormwater so that it can be treated further by filtration or other treatment means, as this water is the most contaminated.

The present invention is an improved form of Pank's U.S. Pat. Nos. 5,746,911, and 6,264,835, both entitled "Apparatus for Separating a Light From a Heavy Fluid." Like these two devices, the present invention has three separate flow paths for influent water, and treats contaminated water at varying levels of efficiency, depending on the influent flow rate.

FIGS. 1 to 5 show the preferred form of the invention, which has a single outlet pipe. FIGS. 6 to 10 show a modified form of the invention which has separate outlets for treated and untreated effluent streams.

The preferred form of the invention comprises a single rectangular vault structure 10 divided into two chambers 12 and 13 by a vertical wall 30. The first chamber 12 contains an inlet 14 and outlet 18; an open circular conduit 15 that penetrates the vertical dividing wall 30 at the water surface of chamber 12 and turns downward, delivering water of the second chamber 13 below the water surface of chamber 13; a second circular conduit 16 that penetrates the vertical dividing wall 30 below the water surface runs up (of chamber 13) ward to a sequestered outlet basin 19 in the first chamber 12. A vertical baffle wall 17 extends downward from above the dry-weather water surface of chamber 12 to approximately half the depth of the water column of chamber 12. Said outlet basin 19 is in communication with the outlet pipe 18 which discharges the treated water to a river or other body of water, and is bounded by a vertical barrier 31 that extends upwards from the bottom of the outlet basin 19 to a point above the dry-weather water surface elevation but below the top of the previously described baffle wall 17. The present invention is shown in FIGS. 1 to 5.

The outlet pipe 18 has a small inlet basin 19 in the lower part of the front end of outlet conduit 18.

The outlet pipe 18 is preferably at or near a corner of the vault 10 and the baffle 17 preferably extends from one side wall of the vault 10 to another side wall so that water to the outlet pipe 18 must, in some cases, pass under the baffle 17 before it reaches the entrance to outlet pipe 18. To enable the above result the baffle 17 extends upward to an elevation higher than the middle of outlet pipe 18 and higher than basin 19 (FIG. 2) and baffle 31. Further baffle 17 extends downward to a level below the lowest part of the entrance to outlet pipe 18 and/or outlet basin 19. The baffle 17 extends upwards from the bottom of the outlet basin 19 to a point above the dry-weather water surface but below the top of the previously described baffle wall.

In the present invention, contaminated water enters the system through the inlet pipe 14. When low flow rates of water enter the system, the water surface elevation in the first chamber 12 rises, and water begins to flow into the circular conduit 15 at the water surface. From conduit 15, water flows into the second chamber 13, entering said second chamber below the water surface. In the second chamber 13, sediment settles toward the floor of the chamber and lighter fluids separate and rise toward the water surface of the chamber. The water entering the second chamber displaces water from below the surface, forcing it through the second conduit 16 to the outlet basin 19 in the first chamber 12. From the outlet basin 19, the treated water leaves through the outlet pipe 18.

The conduit 15 has a restriction in that it limits the flow through it to the maximum flow rate that can be considered "low rates of flow", (see the first sentence of the Summary of the Invention, supra).

When the water enters the invention at an intermediate flow rate, the previously described flow pattern continues. However, there is more water entering than can be passed through flow paths 15, 16 and 19. In this case, the water level in the first chamber 12 rises until there is sufficient pressure to force excess water to flow underneath the first vertical baffle wall 17 in the first chamber and then over the barrier 31 and into the outlet basin 19, from which this water exits the system. (See the first sentence of the Summary of the Invention, supra).

When water enters the invention at high flow rates, the low flow and intermediate flow paths described above are too restrictive to pass the entire volume of water entering inlet pipe 14. Hence, excess water flows over the top of the vertical baffle 17 in the first chamber 12 and over the vertical barrier 31 into the outlet basin 19. From the outlet basin, the water leaves the invention through the outlet conduit 18.

During said high rate of flow, the water continues to flow through the paths described above for the "low" and "intermediate" flows.

Modified Forms of the Invention

A second form of the present invention, shown in FIG. 6 to 10, includes slightly different flow controls. The rectangular vault is also divided into two chambers 12 and 13, separated by a vertical wall 30. There is also a circular conduit 15 penetrating the dividing wall 30 at the water surface and delivering water to the second chamber 13 below the water surface of the second chamber 13. In the first chamber 12, there is also vertical baffle 17 identical to the baffle in the primary form of the invention, and a barrier 31 surrounding the outlet basin 19 as was the case in the preferred form of the invention. There is a second conduit 20 penetrating the dividing wall 30, at a point above the dry-weather water surface elevation. In the first chamber 12, this circular conduit 20 makes a 90 degree bend and extends below the dry-weather water surface in the first chamber 12. On the other side of the dividing wall, this pipe runs through the second chamber 13 and again penetrates the outer wall bounding the diverted flow outlet basin 21 in the second chamber 13 of the structure.

In this modified form of the invention, a diverted flow outlet basin 21 is located in the second chamber 13. A circular conduit 22 extends from the bottom of the diverted flow outlet basin 21 to a point below the water surface in the second chamber 13, where the conduit 22 is open at the bottom. In this form of the invention, the diverted outlet basin 21 comprises a larger circular conduit set horizontally that penetrates the outer wall of the rectangular vault. The diverted flow outlet basin 21 is bounded on the inside by a vertical wall that is penetrated by the circular conduit 20 running through the second chamber 13 from the first chamber 12.

In this form of the invention, the low and moderate flow situations both discharge treated water through the diverted flow outlet basin 21 in the second chamber 13 of the structure. This outlet may lead to an extended detention system or other treatment technology for further effluent cleaning. During high flow situations, this outlet still discharges relatively clean water for further cleaning; at the same time, the excess water is discharged from the first chamber 12 under the baffle wall 17 and over the vertical barrier 31 of the outlet basin 19 to the outlet pipe 18. This excess water is generally not intended for further treatment, and is discharged into the environment.

Figure 11:
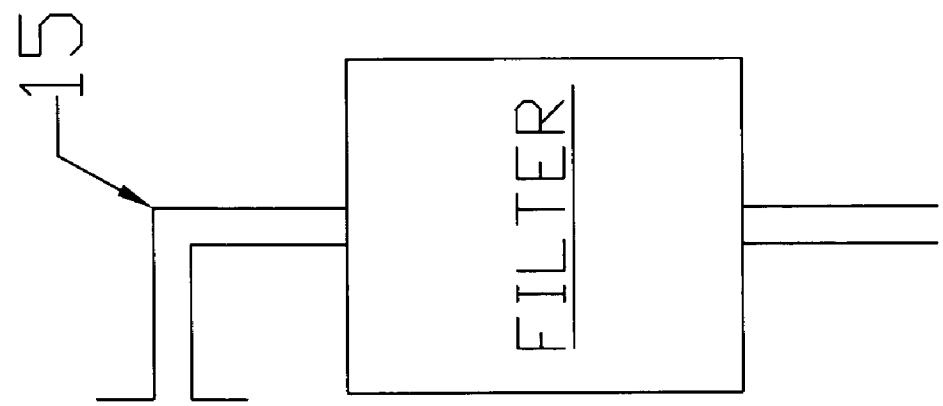
FIG. 11 is a schematic drawing of a filter that may replace the gravity separator of FIG. 1.

FIG. 11 shows that instead of the low flow being cleaned by gravity it may be cleaned by a filter. A suitable filter is shown and described in my prior copending application Ser. No. 11/030,939 filed Jan. 7, 2005. That application is incorporated by reference.

FIG. 12 shows that further filtering can be attained by placing a filter, such as the one hereinabove incorporated by reference, in conduit 16.

I claim to have invented:

1. Apparatus for cleaning runoff water comprising:
a unitary vault having a floor, side walls, end walls and a dividing wall defining first and second chambers within said vault;
an input conduit for supplying runoff water to said first chamber at a first elevation above said vault floor;
a discharge conduit spaced above said bottom at said first elevation and having an inlet for receiving water from said vault above said first elevation ,
a baffle positioned between said input and said discharge conduits, extending across said first chamber, and having a lower edge at a second elevation below said first elevation and a upper edge at a third elevation above said first elevation and above the elevation of said discharge conduit input, such that transfer of floating contaminates on the input side of said baffle to the discharge side is impeded;
a low flow conduit positioned at said first elevation and fed by surface water in said first compartment once said water has risen within said compartment to said first elevation, for delivering such water and floating contaminates into said second compartment at a lower elevation;
a transfer conduit with a first end in said second chamber, positioned at a fourth elevation below said second elevation, said transfer conduit extending into said discharge conduit at said first elevation wherein as the level of water in said second chamber rises, water from below the surface of the water in said second chamber is transported to said discharge conduit without said floating contaminates and is discharged from said vault.

2. Apparatus for cleaning runoff water as defined in claim 1, in which at least a portion of said low flow conduit, that is fed by runoff water from said first chamber, is restricted in size so that it limits the flow of said runoff water to said second chamber, thereby causing runoff water that does not enter said low flow conduit to rise in said first chamber, so that the level of runoff water in said first chamber rises until it reaches a level above said inlet of said discharge conduit with at least some of the runoff water passing under said baffle on its way to said discharge conduit.

3. Apparatus for cleaning runoff water as defined in claim 2, wherein when the runoff water in said first compartment rises above the upper end of said baffle, some of the water from said inlet flows directly over said baffle to said outlet conduit.

4. Apparatus for cleaning runoff water as defined in claim 1, having a diverted flow outlet basin and means for receiving runoff water from said vault to said diverted flow outlet basin.

5. Apparatus for cleaning runoff water as defined in claim 4, in which excess water in said vault passes under said baffle to said outlet conduit.

* * * * *